M. P. HOLMES.
TRUCK.
APPLICATION FILED DEC. 11, 1918. RENEWED FEB. 4, 1921.
1,378,818.
Patented May 17, 1921.
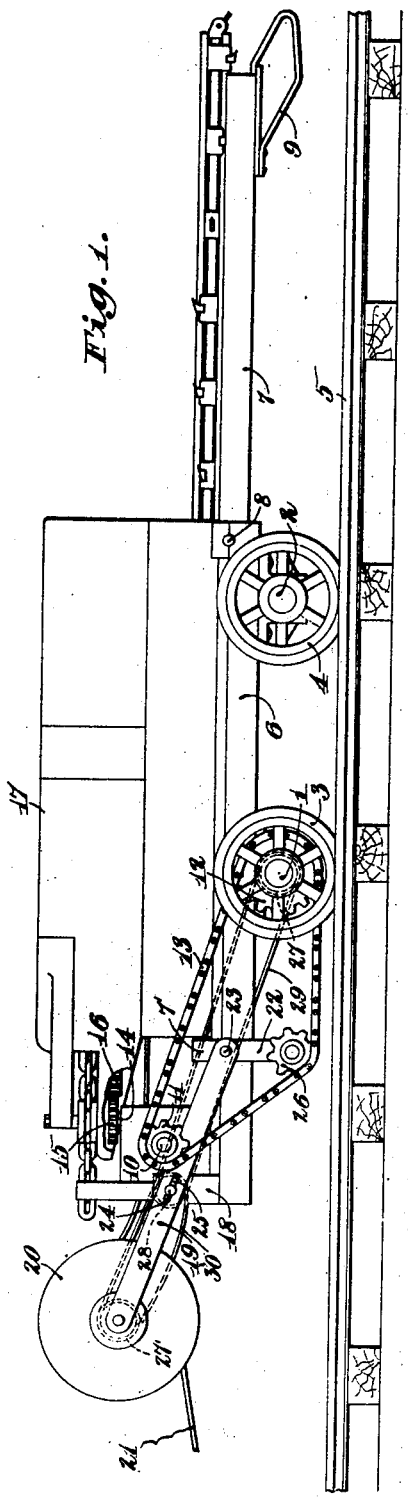
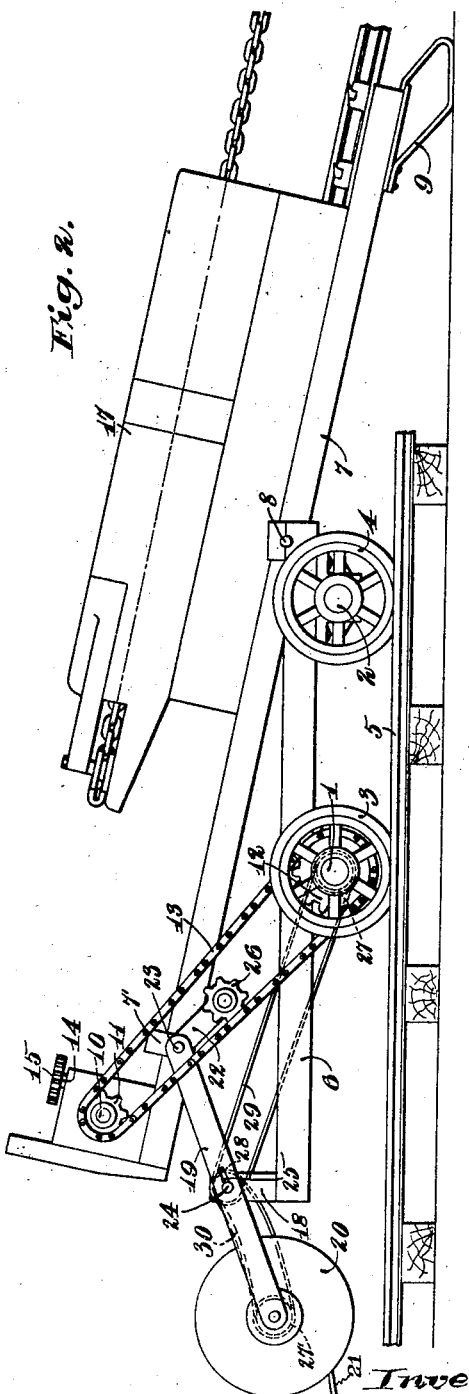
Inventor:
Morris P. Holmes.

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,378,818.            Specification of Letters Patent.          Patented May 17, 1921.

Application filed December 11, 1918, Serial No. 266,317. Renewed February 4, 1921. Serial No. 442,598.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks, and more particularly to mining machine trucks, the object of the present invention being to provide a counterbalanced, tilting, solid frame truck which will remain in a tilted position after the unloading of the mining machine but which will be automatically returned to a horizontal position when the machine is loaded onto the truck.

This improved truck possesses the advantages of the solid frame trucks now in use in that the bed or main truck frame is solid and substantial, without having the disadvantages of this type of truck in which the rear wheels are raised from the track during the unloading operation and are permitted to fall on the track after the mining machine is unloaded, with a resulting breakage of car wheels, cable reel supports and, frequently, a derailing of the truck. These and other objects and advantages of my improved construction will hereinafter more fully appear.

In the accompanying drawings I have shown for purposes of illustration one embodiment which my invention may assume in practice.

In these drawings,—

Figure 1 is a side elevation of my improved truck with the mining machine thereon in loaded position.

Fig. 2 is a side elevation of the truck with the mining machine unloading therefrom.

Referring to the drawings, I have there shown for the purpose of illustrating the principal features of the invention, a four-wheel truck having a plurality of axle members 1 and 2 carrying wheels 3 and 4 adapted to run on rails 5. The axles 1 and 2 are preferably secured to a relatively short rigid frame 6 in such a manner that the parts so far described comprise a small, strong truck, the frame of which projects to the rear of the rear axle for a considerable distance but projects but slightly in front of the front axle.

The main truck frame member or body 7 is pivoted, as shown at 8, to the front end of the frame 6 and extends forward to provide a loading skid, as is common in machines of this type, the forward end carrying a loading shoe 9, preferably formed of a forwardly extending and reversed frame member, this shoe functioning to hold the front end of the frame member 7 off the mine floor, and as a skid member, to facilitate the loading of the mining machine. The opposite or rear end of the main frame member 7 extends to the rear of the rear axle 1 substantially the same distance as the auxiliary or small frame member 6, the main frame being adapted to contact with and rest on the auxiliary frame when the truck is in loaded position, as shown in Fig. 1.

Horizontally mounted on the rear end of the main frame 7 is a driving shaft 10 carrying a sprocket wheel 11 adapted to drive the truck along the track by means of a sprocket wheel 12 mounted on the rear axle 1 and a chain 13 connecting the sprockets 11 and 12. This horizontal shaft 10 is in turn driven through a substantially vertically disposed shaft 14 connected with the shaft 10 by worm gearing (not shown), a gear 15 mounted on said shaft 14, and a driving gear 16 carried by the mining machine 17, it being clear from Fig. 1 that when the mining machine is in loaded position the gears 15 and 16 mesh in such a manner that the mining machine motor is adapted to drive the truck along the track through the connections just described. A stop 7' is rigidly mounted on the frame 7 to limit the movement of the mining machine onto the truck to prevent injury to the gears 15, 16.

In my improved construction herein shown, there is mounted on each side on the rear of the auxiliary frame 6 an upright support 18 carrying two levers 19 (only one being shown herein), on one end of which is rotatably mounted a cable reel 20 carrying a cable 21, it being understood that in mining machines using compressed air as the motive power the drum or reel 20 may be used to carry a hose. One of these levers 19 is formed as a bell crank, the opposite end 22 from the drum 20 being disposed at an angle to the main part of the lever 19, the bell crank being pivoted at the angle thereof to the main frame 7, as shown at 23. The longer, reel carrying arm of the lever 19 is supported from the upright 18 by means of a bolt 24 carried by the upright and passing through a slot 25 in the lever to provide for a relative displacement of the lever and support as the two frames 6 and 7 are moved to or from loaded position. An idler wheel or sprocket 26 is rotatably mounted on the shorter arm 22 of the bell crank in the path of the chain 13 is such a manner that as the rear of the frame 7 moves downwardly, thus permitting the chain 13 to slacken, the idler wheel 26 also moves downwardly and engages the chair to take up the slack therein.

The winding reels or drums commonly used on mining machines weigh in practice in the neighborhood of three hundred pounds, and the drum supporting means just described constitutes a means whereby this drum weight is utilized to counterbalance the weight of the main truck frame 7 in such a manner that when the mining machine has been unloaded and is free from the truck frame the reel weight holds the frame 7 tilted to unloading or loading position, as illustrated in Fig. 2.

As is common in machines of this type, there is provided a drum rotating mechanism, herein shown as composed of a driving wheel or sprocket 27, preferably mounted on the rear axle, a driven wheel or sprocket 27' mounted on a head of the drum, a pair of sprockets 28 mounted on the rod or bolt 24 for rotation thereon in unison, and flexible members, as chains 29 and 30, respectively connecting the sprocket 27 with one of the sprockets 28 and the other sprocket 28 with the sprocket 27' in such a manner that the rotation of the rear axle is transmitted to the drum to rotate the latter in one direction or other, thereby paying out the cable as the mining machine truck is moved toward the right (as shown in the drawings) and taking said cable in as the truck is moved toward the left.

From the foregoing description it is evident that as the mining machine is moved from loaded position (Fig. 1) to unloading position (Fig. 2), the weight the the mining machine will tilt the main frame 7 on the pivot 8, with respect to the auxiliary frame 6, until the shoe 9 contacts with the mine floor, and that when the mining machine is entirely unloaded, the truck will remain in unloading position ready to receive the mining machine 17 when it is desired to reload the latter. During the operation of reloading the mining machine, as the center of gravity moves to the left of the pivot 8 the weight of the mining machine will gradually overcome the weight of the reel 20 and will tilt the frame 7 back into contact with the frame 6, as shown in Fig. 1, the gear 16 automatically meshing with the gear 15 to drive the truck.

It will be obvious that in passing through the intermediate positions between that shown in Fig. 1 and that shown in Fig. 2, the arms 19 are moved bodily toward the left until the other end of the slots 25 approach the bolts 24 and that by reason of such movement, the connection 30 would have to be extended. Accordingly, in the present case where a chain is used, I customarily remove the chain, for example, by means of a detachable link, but it will be obvious that any flexible driving means could be used as, for example, a spring belt.

By my improved construction it will be apparent that I have provided a small truck frame substantially constructed, that I have pivotally mounted on this truck a rigid mining machine supporting frame, and that I have provided means, herein shown as mounted on the small frame, for counterbalancing the weight of the main frame member for normally holding the latter in a tilted position when the mining machine is unloaded. It is further evident that I have provided a driving connection between the mining machine and the truck running gear in such a manner that this driving connection need not be broken during the tilting of the main frame 7, and that I have provided automatic means for taking up the slack in the driving chain which is a part of this driving connection.

While I have in this application specifically described one embodiment which my invention may assume in practice, it is to be understood that the invention is not limited thereto but may be embodied in various other forms without departing from its spirit.

What I claim as new and desire to secure by Letters Patent is:

1. In a mining machine truck, a wheeled frame, a machine carrying body pivoted at the front end thereof and tiltable by a mining machine movable thereover, and counterbalancing means mounted on said frame for retaining said body in a tilted position.

2. In a mining machine truck, a wheeled frame, a machine carrying body pivoted at the front end thereof and tiltable by a mining machine movable thereover, and reel supporting means mounted on said frame for retaining said body in a tilted position.

3. In a mining machine truck, a wheeled frame, a machine carrying body pivoted at the front end thereof and tiltable by a mining machine movable thereover, and counterbalancing means mounted on said frame and engaging said body for retaining said body in a tilted position.

4. In a mining machine truck, a wheeled frame, a machine carrying body pivoted at the front end thereof and tiltable by a mining machine movable thereover, and counterbalancing means pivotally mounted on said frame for retaining said body in a tilted position.

5. In a mining machine truck, a wheeled frame, a machine carrying body pivoted at the front end thereof and tiltable by a mining machine movable thereover, and reel supporting means pivotally mounted on said frame for retaining said body in a tilted position.

6. In a mining machine truck, a wheeled frame, a machine carrying body pivoted at the front end thereof and tiltable by a mining machine movable thereover, and counterbalancing means pivotally and bodily movable on said frame and engaging said body for retaining the latter in a tilted position.

7. In a mining machine truck, a wheeled frame, a machine carrying body pivoted at the front end thereof and tiltable by a mining machine movable thereover, and reel supporting means mounted on said frame on a sliding pivot and engaging said body for normally retaining the latter in a tilted position.

8. In a mining machine truck, a wheeled frame, a machine carrying body pivoted at the front end thereof and tiltable by a mining machine movable thereover, a body counterbalancing means mounted on the rear end of said frame, and truck driving means mounted on said frame and body.

9. In a mining machine truck, a wheeled frame, a machine carying body pivoted at the front end thereof and tiltable by a mining machine movable thereover, and means including a counterbalancing element movable on said frame and operated by a tilting movement of said body for retaining the latter in a tilted position.

10. In a mining machine truck, a wheeled frame, a machine carrying body pivoted at the front end thereof and tiltable by a mining machine movable thereover, and means mounted on said frame and including a counterbalancing member operated by and operatively connected to said body for retaining the latter in a tilted position.

11. In a mining machine truck, a wheeled frame, a machine carrying body pivoted at the front end thereof and tiltable by a mining machine movable thereover, and means including a counterbalancing reel pivotally mounted on said frame and operated by a tilting movement of said body for retaining the latter in a tilted position.

12. In a mining machine truck, a wheeled frame, a machine carrying body pivoted at the front end therof and tiltable by a mining machine movable thereover, and means including a counterbalancing reel carrying member pivotally mounted on said frame and pivotally connected to said body for retaining the latter in tilted position.

13. In a mining machine truck, a wheeled frame, a machine carrying body pivoted at the front end thereof and tiltable by a mining machine movable thereover, truck driving mechanism carried on one of said elements, and means including a counterbalancing element movable on said frame and operated by a tilting movement of said body for retaining the latter in a tilted position.

14. In a mining machine truck, a wheeled frame, a machine carrying body pivoted at the front end thereof and tiltable by a mining machine movable thereover, truck driving mechanism carried on said body, and means including a counterbalancing element movable on said frame and operated by a tilting movement of said body for retaining the latter in a tilted position.

15. In a mining machine truck, a wheeled frame, a machine carrying body pivoted at the front end thereof and tiltable by a mining machine movable thereover, a body counterbalancing means mounted on the rear end of said frame, driving means mounted on said frame and body and including a flexible member, and means controlled by the counterbalancing means for taking up the slack in the flexible member as the body is tilted.

16. In a mining machine truck, the combination including a wheeled frame, a machine carrying body pivoted thereon, truck driving means including a flexible member, a bell crank pivotally mounted on the body and having sliding pivotal connection with said frame, a counterweight on one end of the bell crank, and tightening means for said flexible member mounted on the other arm of the bell crank.

17. In a mining machine truck, a wheeled frame, a machine carrying body pivoted at the front end thereof and tiltable by a mining machine movable thereover, a reel supporting member pivoted on a fixed pivot on said frame, and an operative connection between the front end of said member and the rear end of said body.

18. In a mining machine truck, a wheeled frame, a machine carrying body tiltable about an axis adjacent the front end of said frame upon movement of a mining machine onto or off of said truck, counter-balancing means operatively connected with said body and adapted to be tilted about a pivot adjacent the rear end of said frame, said mechanism comprising a lost motion connection to permit movement of said body and said counter-balancing means toward and away from alinement.

19. In a mining machine truck, a wheeled frame, a machine carrying body disposed upon said frame and projecting beyond the front end thereof and tiltable to form an inclined plane along which a mining machine may move in loading and unloading, counter-balancing means operatively connected with said body and adapted to be tilted about a pivot adjacent the rear end of said frame, said mechanism comprising a lost motion connection to permit movement of said body and said counter-balancing means toward and away from alinement.

In testimony whereof I affix my signature.

MORRIS P. HOLMES.